(No Model.)  2 Sheets—Sheet 1.

J. G. MINER.
BOILER CLEANER AND FILTER.

No. 314,257. Patented Mar. 24, 1885.

(No Model.) 2 Sheets—Sheet 2.
J. G. MINER.
BOILER CLEANER AND FILTER.
No. 314,257. Patented Mar. 24, 1885.
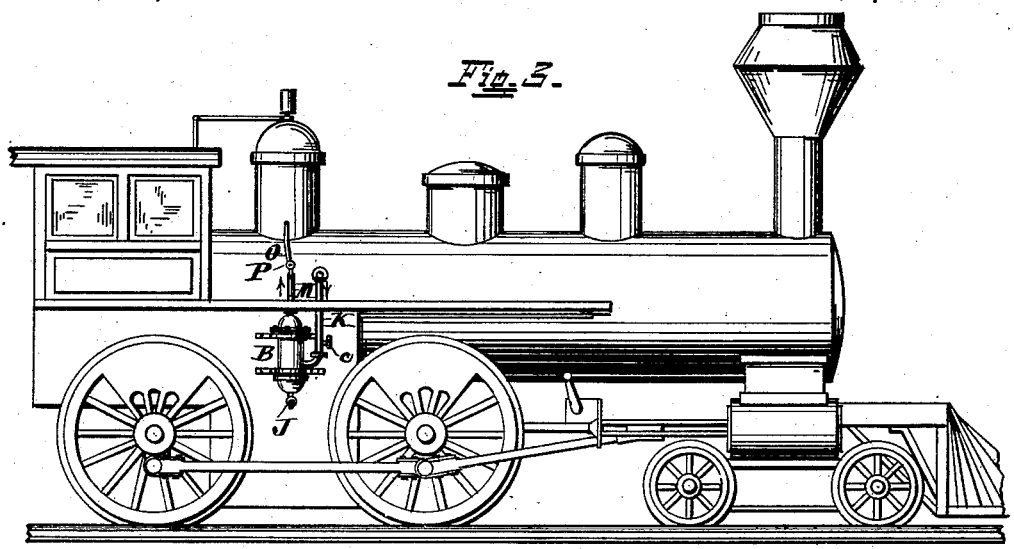
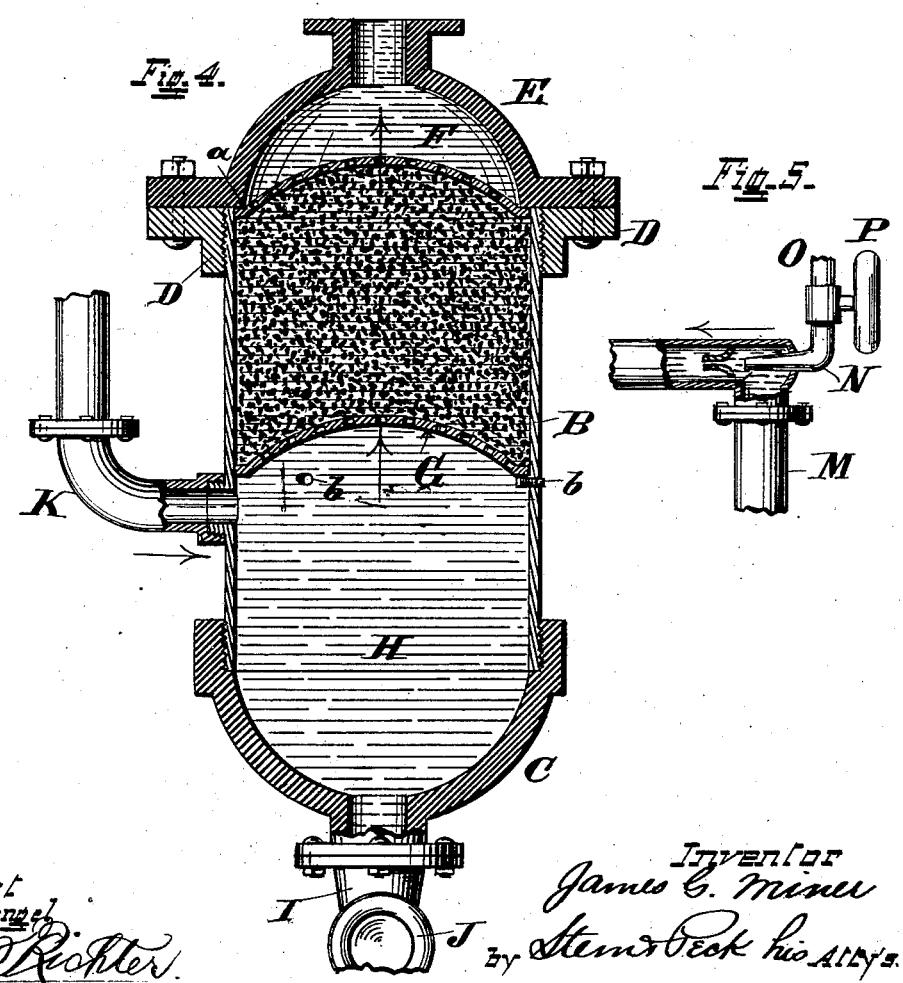

UNITED STATES PATENT OFFICE.

JAMES G. MINER, OF CINCINNATI, OHIO, ASSIGNOR TO JOHN A. ROBINSON, TRUSTEE, OF SAME PLACE.

BOILER-CLEANER AND FILTER.

SPECIFICATION forming part of Letters Patent No. 314,257, dated March 24, 1885.

Application filed June 28, 1884. (No model.)

*To all whom it may concern:*

Be it known that I, JAMES G. MINER, a citizen of the United States, residing at Cincinnati, in the county of Hamilton and State of Ohio, have invented certain new and useful Improvements in Boiler-Cleaners and Filters, of which the following is a full, clear, and exact description, reference being had to the drawings making part of this specification.

My invention has for its object the collection and removal of all the scum, lime, and other impurities contained in the water of a boiler, and the filtration of the same, by which they are collected and prevented from returning to the boiler, whereby scaling and foaming of the boiler is prevented, as well as the collection of sediment.

It consists, essentially, of a novel filtering and sediment-collection chamber with induction and eduction pipes provided with proper stop-cocks, so applied in combination with an injector that the surface-water of the boiler is caused to pass in a constant flow through the filtering-chamber, where its impurities are separated and arrested, and it is discharged back into the boiler in a pure state; and it is designed more particularly for locomotive-boilers, though it is capable of use on any or all steam-boilers.

The novelty consists in the construction and combination of the parts, as will be herewith set forth and specifically claimed.

Figure 1:
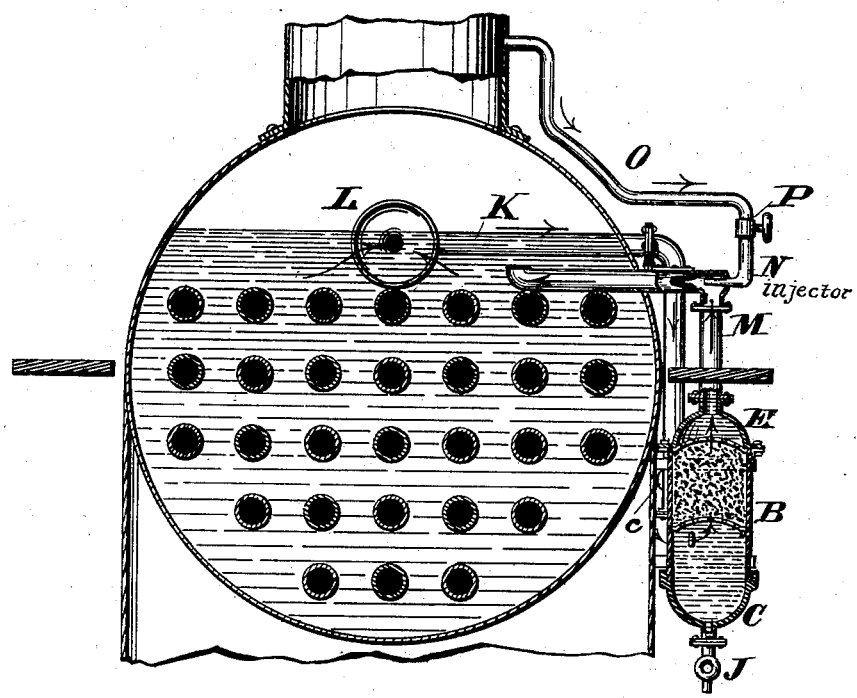
Figure 2:
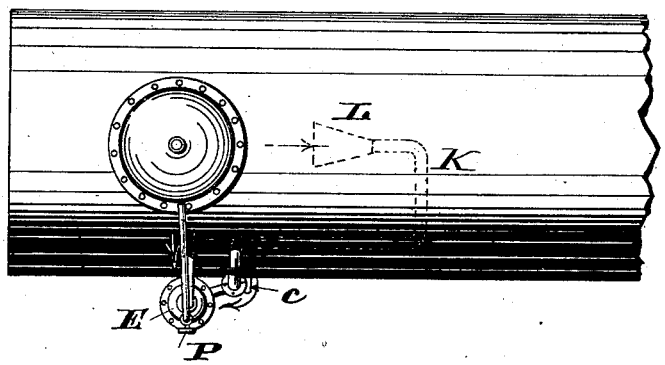

In the accompanying drawings, Figure 1, Sheet 1, is a transverse sectional view of a boiler to which my invention is applied. Fig. 2, Sheet 1, is a diminished plan view of the same. Fig. 3, Sheet 2, is a side elevation of a locomotive, showing the application of my invention. Fig. 4, Sheet 2, is an enlarged central section in elevation of my improved filtering and sediment chamber. Fig. 5, Sheet 2, is an enlarged detail view of the injector.

The same letters of reference indicate identical parts in all the figures.

The filtering and sediment chamber A, Fig. 4, is composed of a tubular shell, B, preferably of lap-welded boiler-iron, open at both ends, of about nine and a half inches in diameter, in order to secure proper clearance for the side rods, and threaded at both ends to receive at its lower end a hemispherical cap, C, and its upper end a flanged collar, D, to which is bolted, as shown, a hemispherical cap, E, thus making a chamber preferably nine and a half inches in diameter and about two feet long. By this construction, and by having two separate heads for the chamber A. I obtain great strength as well as the capability of removing either of the heads for cleansing or inspection at any time, as will be apparent. This chamber, when used as a locomotive-boiler cleaner, is preferably secured, by straps or otherwise, between the drivers, as seen in Fig. 3, and is of such proper dimensions as to clear the parallel rod. The inner edge of the cap E projects over the end of the shell B to form a shoulder, as seen at *a*, to receive and retain the flange of a concavo-convex perforated plate, F, between which and a similar plate, G, at about the middle of the chamber, is confined the filtering material, which may be coke, charcoal, or any other good filtering substance. The plate G is supported and retained by means of taper screw-plugs *b*, (three are sufficient,) inserted from the inside through the shell B, whereby they are prevented from being blown out or leaking. H is the sediment-chamber, having an outlet-pipe or nozzle, I, provided with a stop-cock, J. Within the boiler, as seen in Figs. 1 and 2, is a pipe, K, just submerged, having an enlarged funnel-shaped mouth, L, whose upper side projects slightly above the water-line, and which is preferably located at the middle of the boiler, at which point the surface of the water retains a more constant level, and in rear of the line of the fire-box, toward which its mouth is presented, as seen. This is the arrangement best suited for locomotives running on steep grades; but in case of level grades or in case of stationary boilers the location of the pipes and receiving-mouth is optional. This pipe K may have the bends or elbows shown, and after passing through the side of the boiler extends down, and with suitable connections enters the shell B below the plate or grating G, as seen in Fig. 4. Extending from the top of the cap E, with suitable connections, is a pipe, M, which enters the boiler in a straight line, and is so far submerged as to rest almost if not quite upon the upper flues, as seen in Fig. 1, thereby without other means insuring a constant circulation of the water. Entering the elbow of this pipe M, just outside the boiler, is the nozzle of a steam-injector, N, which is provided to increase the rapidity of the circulation, and which has a pipe-connection, O, with the steam dome or chamber of the boiler, and is provided with a regulating cock or valve, P. From this construction and arrangement it will be readily understood that the impurities which are raised as scum by the ebullition of the water are caught in the mouth L of the pipe K, and are carried down into the filtering-chamber, and have to pass up through the filtering material, where they are arrested, so that the water passing back into the boiler through the pipe M is pure. By means of the injector N a rapid circulation is kept up, so that all of the water in the boiler can be made to pass through the filter in a very short time. The pipe K is provided with a stop-cock, c, so that when it is desired to clean the filtering material and remove the sediment from the chamber H, it would only be necessary to close this cock and the injecting-cock and open the vent-cock J, when a backflow through the pipe M would take place, which would effectually clean out the filtering-chamber.

While I have shown and described the preferable location and arrangement of the pipes and valves, I do not purpose to limit myself to these alone, as it is obvious that they may be varied infinitely to suit the character of the boiler and the preferences of the constructor.

Having thus fully described my invention, I claim—

1. In a boiler-cleaner and filter, the filtering-chamber composed of a tubular shell with removable hemispherical heads, and filtering material supported between separate perforated concavo-convex plates, arranged as shown, and suitable induction and eduction pipes, substantially as described.

2. In a boiler-cleaner and filter, the filtering-chamber composed of the tubular shell B, removable heads C E, grates F G, collar D, shoulder a, and taper plugs b, the parts constructed and united in the manner and for the purpose specified.

3. In a boiler-cleaner and filter, the combination, with a filtering and sediment chamber, of an induction-pipe having a funnel-shaped mouth, and an eduction-pipe provided with a steam-injector, substantially as described.

J. G. MINER.

Witnesses:
W. S. HOLMES,
OTTO RICHTER.